United States Patent
Müller

(10) Patent No.: US 9,315,159 B2
(45) Date of Patent: Apr. 19, 2016

(54) VEHICLE DOOR WITH A LOUDSPEAKER

(75) Inventor: Joachim Müller, Werneck (DE)

(73) Assignee: Brose Fahrzeugteile GmbH & Co. Kommanditgesellschaft, Hallstadt, Hallstadt (DE)

( * ) Notice: Subject to any disclaimer, the term of this patent is extended or adjusted under 35 U.S.C. 154(b) by 0 days.

(21) Appl. No.: 14/007,119

(22) PCT Filed: Apr. 2, 2012

(86) PCT No.: PCT/EP2012/055977
§ 371 (c)(1),
(2), (4) Date: Nov. 21, 2013

(87) PCT Pub. No.: WO2012/131094
PCT Pub. Date: Oct. 4, 2012

(65) Prior Publication Data
US 2014/0086444 A1     Mar. 27, 2014

(30) Foreign Application Priority Data

Apr. 1, 2011     (DE) ...................... 20 2011 000 772 U

(51) Int. Cl.
*H04R 1/02*     (2006.01)
*B60R 11/02*     (2006.01)
(Continued)

(52) U.S. Cl.
CPC ........... *B60R 11/0217* (2013.01); *B60J 5/0413* (2013.01); *B60J 5/0416* (2013.01); *B60J 5/0418* (2013.01); *B60R 13/0884* (2013.01); *H04R 1/02* (2013.01)

(58) Field of Classification Search
CPC ........ H04R 2499/13; H04R 1/02; H04R 1/00; H04R 1/30; B60J 5/00; B60J 5/02; B60J 5/04; B60J 5/0412; B60J 5/0413; B60J 5/0416

USPC .................. 381/302, 71.4, 86, 389, 337–345; 296/146.5, 146.1, 1.08; 49/502
See application file for complete search history.

(56) References Cited

U.S. PATENT DOCUMENTS 3,909,530 A * 9/1975 Gosswiller ............... H04R 1/30
                                                                181/159
4,020,284 A * 4/1977 Phillips ............................ 381/2
(Continued)

FOREIGN PATENT DOCUMENTS

DE     196 22 310 A1    12/1997
DE        19747709 A1 *  5/1999  ................. B60J 5/00
(Continued)

OTHER PUBLICATIONS

International Search Report, dated Jul. 5, 2012, corresponding to PCT/EP2012/055977, 4 pages.
(Continued)

*Primary Examiner* — Davetta W Goins
*Assistant Examiner* — Oyesola C Ojo
(74) *Attorney, Agent, or Firm* — Lewis Roca Rothgerber Christie LLP

(57) ABSTRACT

A vehicle door, comprising an inner door panel and an outer door panel with an inner surface facing the inner door panel, is provided. A loudspeaker which is arranged on the inner door panel, is spaced apart from the outer door panel and is intended for generating acoustic sound waves. A sound-guiding element which is designed to deflect sound waves radiated in the direction of the outer door panel by the loudspeaker and to guide said sound waves into a wet chamber of the vehicle door, which wet chamber is formed between the inner door panel and the outer door panel, and/or into a dry chamber of the vehicle door, which dry chamber is formed on a side of the inner door panel that faces away from the outer door panel.

17 Claims, 20 Drawing Sheets

(51) Int. Cl.
*B60J 5/04* (2006.01)
*B60R 13/08* (2006.01)

(56) References Cited

U.S. PATENT DOCUMENTS

| | | | |
|---|---|---|---|
| 4,790,407 A | 12/1988 | Yamamoto et al. | |
| 5,825,901 A * | 10/1998 | Hisey | 381/165 |
| 6,076,631 A * | 6/2000 | Hoenninger | B60R 11/0217 181/141 |
| 6,076,882 A * | 6/2000 | Szerdahelyi | B60R 21/21 280/730.2 |
| 6,192,632 B1 * | 2/2001 | Medebach | B60J 5/0416 296/146.7 |
| 6,409,250 B1 * | 6/2002 | Schultheiss | B60H 1/248 296/146.7 |
| 7,410,204 B2 * | 8/2008 | Koa | B06J 5/0416 296/152 |
| 7,669,368 B2 * | 3/2010 | Kuhnen et al. | 49/360 |
| 7,815,243 B2 * | 10/2010 | Salzmann et al. | 296/146.7 |
| 7,918,490 B2 * | 4/2011 | Kriese et al. | 296/97.4 |
| 2001/0038228 A1 * | 11/2001 | Morrison | B60J 5/0416 296/146.5 |
| 2004/0141625 A1 * | 7/2004 | Leipold | B60R 11/0217 381/86 |
| 2006/0049664 A1 | 3/2006 | Koa | |
| 2010/0146862 A1 * | 6/2010 | Lin | B60J 5/0416 49/502 |
| 2012/0292125 A1 * | 11/2012 | Kriese et al. | 181/207 |

FOREIGN PATENT DOCUMENTS

| | | | |
|---|---|---|---|
| FR | 2 905 323 | 3/2008 | |
| WO | WO 9800329 A1 * | 1/1998 | B62D 65/00 |
| WO | WO 2007/006296 A1 | 1/2007 | |

OTHER PUBLICATIONS

English translation of the International Preliminary Report on Patentability for International Application No. PCT/EP2012/055977, dated Oct. 2, 2013, 7 pages.

Chinese Office action dated Mar. 4, 2015 for Application No. 201280017390.2, 9 pages, and English translation, 3 pages.

* cited by examiner

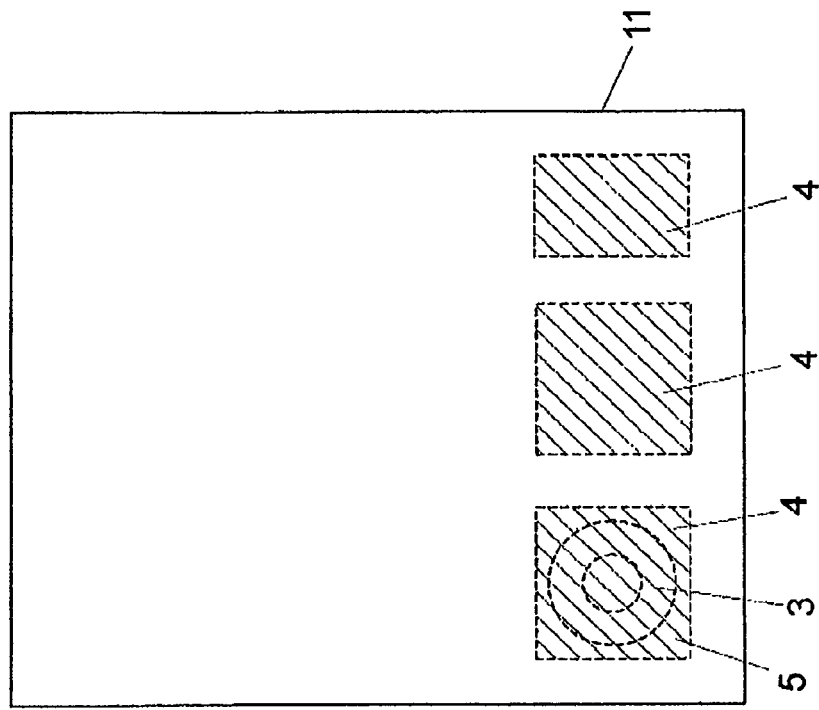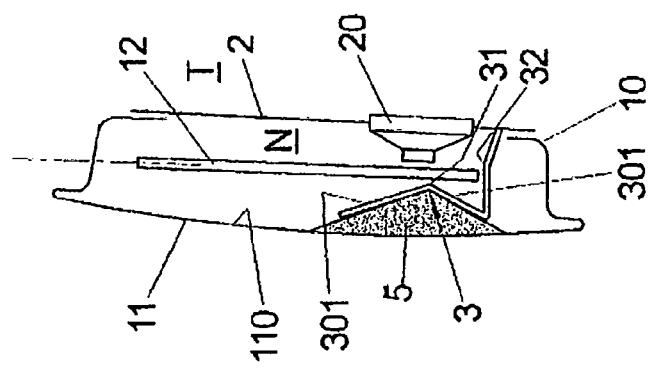

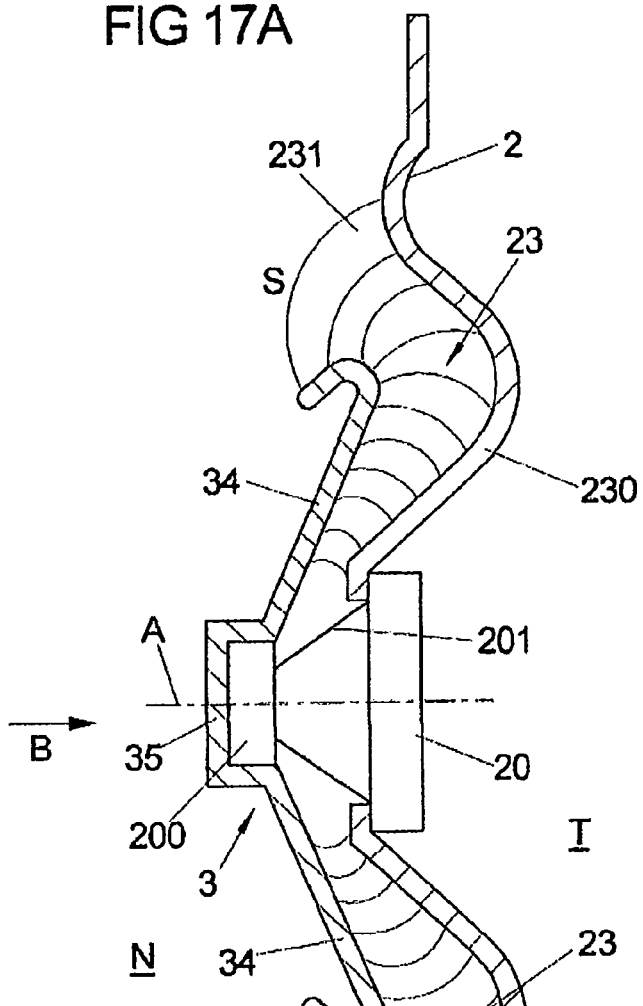
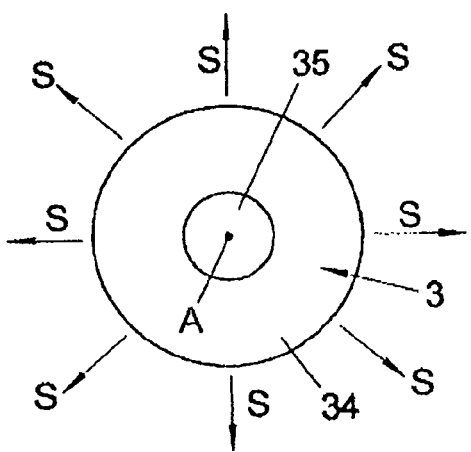

VEHICLE DOOR WITH A LOUDSPEAKER

CROSS-REFERENCE TO A RELATED APPLICATION(S)

This application is a National Phase Patent Application and claims priority to and benefit of International Application Number PCT/EP2012/055977, filed on Apr. 2, 2012, which claims priority to and benefit of German Patent Application Number 20 2011 000 772.3, filed on Apr. 1, 2011, the entire disclosures of which are incorporated herein by reference.

BACKGROUND

The invention relates to a vehicle door.

A vehicle door of this type has an inner door panel, an outer door panel with an inner surface facing the inner door panel, and a loudspeaker which is arranged on the inner door panel, is spaced apart from the outer door panel and is intended for generating acoustic sound waves.

In the case of a vehicle door of this type known, for example, from DE 196 22 310 A1 loudspeaker is arranged on a unit carrier of a door module and is fastened to an inner door panel via the unit carrier of the door module. The loudspeaker which is designed as a conical loudspeaker projects into a wet chamber of the vehicle door, which wet chamber is formed between the inner door panel and the outer door panel, and, during operation, radiates acoustic sound waves both forward in the direction of a vehicle interior and rearward in the direction of the outer door panel.

In vehicle doors known nowadays, conical loudspeakers are frequently used for transmitting music within a frequency range of between 20 Hz and 10 kHz.

Such loudspeakers are mounted, for example, on a door module, on an inner door panel or on an inner door lining. A vehicle door can have a single loudspeaker or else a plurality of loudspeakers.

During the operation of a conical loudspeaker, a diaphragm is oscillated in order to generate airborne sound waves. Said sound waves propagate as airborne sound, wherein the sound waves are firstly radiated into the vehicle interior and secondly into the inner door region. Structure-borne sound generated by the loudspeaker can likewise also be coupled via the loudspeaker connection into the surrounding structure, for example the vehicle door. This can lead to an excitation of the structure of the vehicle door, which can then itself lead to a further excitation of the loudspeaker. The surrounding structure is further excited via the change in compression of the air volume located in the door by means of the loudspeaker which can then again excite the surrounding structure (vehicle door, for example inner door panel, outer door panel) to oscillate and therefore, in turn, leads to an airborne sound radiation of the structure. If said excitation of the structure has a phase displacement of between 0° and 180° with respect to the deflection of the loudspeaker, this may contribute to undesirable amplifying or extinguishing of the sound event and may cause negative fading, booming or reverberating and also an increase in the distortion factor (distortion) of the loudspeaker tone. Similarly, fading, blurring or booming of the loudspeaker tone may occur due to the formation of stationary waves in resonant structures or due to the excitation of structure-borne sound and the associated generation of secondary airborne sound because of oscillations and vibrations of components.

In order to avoid such disadvantageous effects on the acoustics, the use of an absorbing film or an absorbing fleece or a heavy film in or on door structures is known from the prior art. In addition, a dosed air volume can be provided for a loudspeaker. However, these measures have the disadvantage of possibly bringing about high costs and an increased weight and also a greater construction space in or on the vehicle door.

The radiation of sound waves in the direction of the outer door panel may also lead to an excitation of structure-borne sound of the outer door panel. Such an excitation of structure-borne sound takes place in particular if radiated sound waves strike perpendicularly against the outer door panel and, as a result, can advantageously be coupled into the structure of the outer door panel. Similarly, by direct acoustic irradiation of the outer door panel (direct sound strikes from the rear side of the loudspeaker via a free airborne sound path against the wet chamber side of the outer door panel and wet chamber of the door), the absorption of ultrasonic transmissions is determined only by the material, the structural properties of the outer door panel and the acoustic tightness of the wet chamber of the door toward the outer side of the vehicle. Said sound paths are bidirectional, and therefore sound—for example, speech which is radiated by the loudspeaker—can be perceived outside the vehicle. Furthermore, noises from outside the vehicle (tire noise, wind noises, driving noises . . . ) can pass via said sound paths into the passenger compartment and cause a deterioration in the interior noise level.

Precisely because of the extensive, lightweight structural composition of the outer door panels, the excitation by means of air and structure-borne sound produces a weak point here. This can lead, for example, to sound waves also being radiated outwards, i.e. into the exterior space outside the vehicle, and therefore sound waves generated by the loudspeaker are perceptible outside the vehicle, which may lead, for example, if the loudspeaker is used within the scope of a hands free telephone system, to telephone conversations being able to be heard outside the vehicle.

SUMMARY

It is an object of the present invention to provide a vehicle door of the type mentioned at the beginning which, with simple means, permits an improvement in the system acoustic while reducing the excitation of structure-borne sound, in particular at the outer door panel.

According to an exemplary embodiment of the invention, a vehicle door is provided with a sound-guiding element which is designed to deflect sound waves radiated in the direction of the outer door panel from the loudspeaker and to guide said sound waves into a wet chamber of the vehicle door, which wet chamber is formed between the inner door panel and the outer door panel, and/or into a dry chamber of the vehicle door, which dry chamber is formed on a side of the inner door panel that faces away from the outer door panel.

For example, the sound-guiding element can be formed by a diffuser which is arranged between the loudspeaker and the outer door panel and is designed to reflect sound waves radiated in the direction of the outer door panel from the loudspeaker in such a manner that they do not strike in a directly radiated manner perpendicularly against the inner surface of the outer door panel.

The sound-guiding element can have, in particular, a reflection surface which is directed at an oblique angle to a main plane of extent along which the outer door panel substantially extends.

The invention is based on the concept of decoupling the sound radiated rearward from a loudspeaker from the outer door panel. The sound waves radiated in the direction of the outer door panel from the loudspeaker are intended here not to strike in a directly radiated manner perpendicularly against the outer door panel so as, as far as possible, to avoid or at least to reduce an excitation of the outer door panel to form structure-borne sound. At the same time, the sound waves are intended not to be reflected back directly to the loudspeaker so as to avoid the sound waves which are reflected back from being able to pass through the loudspeaker.

For this purpose, a reflection surface which is positioned obliquely with respect to the main plane of extent of the outer door panel is provided. The oblique angle can be, for example, between 20° and 70°, preferably between 30° and 60°. If the loudspeaker is arranged on the inner door panel in a plane lying approximately parallel to the main plane of extent of the outer door panel, the loudspeaker will radiate a not inconsiderable portion of the sound waves radiated rearwards in a perpendicular direction toward the outer door panel. The oblique arrangement of the reflection surface in said beam path of the sound waves radiated rearwards causes said sound waves which are radiated rearwards not to be able to strike perpendicularly against the inner surface of the outer door panel, which inner surface faces the loudspeaker, and at the same time reflection back to the loudspeaker is avoided. On the contrary, the sound waves are deflected because of the oblique arrangement of the reflection surface in such a manner that they are reflected, for example, preferably parallel to the main plane of extent of the outer door panel or at a low angle onto the inner surface of the outer door panel or strike the inner door panel or a door module connected to the inner door panel such that only low excitation of structure-borne sound can take place at the outer door panel.

Within the context of the present text, the fact that the sound waves are intended not to strike in a directly radiated manner perpendicularly against the inner surface of the outer door panel is intended to be understood as meaning that sound waves radiated in the direction of the outer door panel from the loudspeaker cannot propagate directly in the direction of the outer door panel and, in the process, strike on a direct path of propagation perpendicularly against the outer door panel. The sound-guiding element interrupts so to speak the path of propagation of such sound waves which are radiated from the loudspeaker and which would otherwise—without the sound-guiding element—strike perpendicularly against the inner surface of the outer door panel. A direct propagation of sound waves and a perpendicular striking of such sound waves against the inner surface of the outer door panel are therefore prevented.

It may be entirely possible here that other sound waves—i.e. sound waves which, upon direct propagation in the direction of their beam path, do not strike perpendicularly against the inner surface of the outer door panel—can move past the sound-guiding element and can strike in a directly radiated manner against the inner surface of the outer door panel.

Furthermore, it may be possible for sound waves to strike perpendicularly against the inner surface of the outer door panel after multiple reflection.

"Perpendicularly" can also be understood here as meaning an angular range of 90°+/− α, for example 90°+/− 15°, with respect to the (main) plane of extent of the outer door panel such that the sound-guiding element also deflects sound waves which would not strike in a directly radiated manner from the loudspeaker exactly perpendicularly against the inner surface of the loudspeaker.

The sound-guiding element can have, for example, a body in the form of a rhombus or a cone. In this case, the body can have a tip which faces the loudspeaker and is arranged in particular concentrically with respect to a center axis of the loudspeaker, which center axis points through the center of gravity of the loudspeaker and runs along a main direction of radiation of the loudspeaker. Said center axis can correspond, for example, to an axis of rotational symmetry of the loudspeaker, in particular if the loudspeaker is designed as a conical loudspeaker with a conical diaphragm.

The configuration of the sound-guiding element is not restricted to the shaping of a rhombus or a cone. In principle, the sound-guiding element can have any desired shape as long as the sound-guiding element is configured only to reflect sound waves radiated in the direction of the outer door panel from the loudspeaker in such a manner that they do not strike perpendicularly against the inner surface of the outer door panel. The sound-guiding element can be generally formed by one or more obliquely positioned reflection surfaces which run at an oblique angle to the main plane of extent of the outer door panel.

A sound-guiding element of this type can be fastened, for example, via braces to the inner door panel or to a door module arranged on the inner door panel. Sound waves here can run away from the sound-guiding element between the braces such that sound waves reflected from the sound-guiding element can be radiated from the region of the sound-guiding element. In addition, slats for further reflection and diverting of sound waves reflected at the sound-guiding element can also be arranged on the braces, and therefore the sound waves can be guided away from the sound-guiding element in a desired manner.

In an alternative configuration, the sound-guiding element itself can also be formed by a number of slats which are directed at an oblique angle to the main plane of extent along which the outer door panel substantially extends. The slats here reflect the sound waves radiated in the direction of the outer door panel from the loudspeaker in such a manner that they, as far as possible, do not strike perpendicularly against the outer door panel and are also not directly reverberated to the loudspeaker.

A number of slats can be arranged adjacent to one another here and in a manner overlapping one another, as seen in the direction of the outer door panel from the loudspeaker, and therefore the beam path between the loudspeaker and the outer door panel is closed by the slats in such a manner that sound waves radiated in the direction of the outer door panel from the loudspeaker cannot strike directly against the outer door panel.

In a preferred configuration, the slats can be formed on an inner surface, which faces the loudspeaker, in a reflecting manner in order to reflect sound waves radiated in the direction of the outer door panel from the loudspeaker. By contrast, on an outer surface facing away from the loudspeaker, the slats can bear an absorbing layer which is configured for absorbing sound waves. It can thereby be achieved that the slats which are arranged adjacent to one another and are positioned obliquely in each case reflect the sound waves radiated in the direction of the outer door panel from the loudspeaker at the inner surface facing the loudspeaker, to be precise in each case toward the outer surface of an adjacent slat such that the sound waves are completely or at least partially absorbed at said outer surface via the absorbing layer arranged thereon.

The absorbing layer here can be configured to absorb the sound waves striking thereagainst within a predetermined frequency range. For example, it can be provided that higher frequency portions, for example portions within a frequency range of between 1 kHz and 10 kHz, are absorbed at the absorbing layer. By contrast, low-frequency portions can be reflected at the absorbing layer, and therefore the low-frequency portions can be transmitted via the sound-guiding element by the slats thereof. The sound-guiding element therefore has a type of filter function, by means of which higher-frequency portions of the sound waves radiated in the direction of the outer door panel can be suppressed in a specific manner.

In principle, a reflection surface of the sound-guiding element can in general be configured in such a manner that sound waves are reflected differently in an acoustically differentiating manner depending on the frequency thereof. A reflection surface of the sound-guiding element can thus be generally configured in such a manner that certain frequency portions are reflected, but other frequency portions are transmitted or absorbed. For this purpose, the reflection surface can have a suitable coating (reflecting or absorbing depending on the frequency) or else can be of multi-layered construction. By means of the provision of a suitably designed reflection surface, the sound waves radiated in the direction of the outer door panel can therefore not only be changed in the direction thereof but also can be influenced in a specific manner in the frequency distribution thereof.

The loudspeaker is advantageously arranged on a door module of the vehicle door, which door module is connected to the inner door panel. In this case, the sound-guiding element can be fastened to the door module, for example can be integrally formed with a unit carrier of the door module, and, for this purpose, can be formed integrally, for example, by plastics injection molding, with the unit carrier, which is produced from plastic. A sound-guiding element in the form of a rhombus or a cone or a cage with slats can be connected here to the door module via braces.

Similarly, however, the sound-guiding element can also be fastened to the outer door panel and/or to the inner door panel.

In addition, it is also conceivable to connect the sound-guiding element firstly, for example, to the door module or to the inner door panel and, secondly, to the outer door panel in order thereby to provide additional support between the door module or the inner door panel and the outer door panel. In this case, the connection can be produced, for example, via an acoustically damping material such that sound waves cannot be transmitted via the support.

Within the context of integrating a plurality of functions into a single component, the sound-guiding element can have a crash pad designed to absorb crash forces, or can be connected to such a crash pad. The crash pad here can be arranged within the body of the sound-guiding element or can partially extend through the sound-guiding element. The crash pad here is optimized in a specific manner in order to be able to absorb and divert crash forces acting in the event of a crash and, within the context of a crumple zone, to provide protection for vehicle occupants located in the vehicle interior.

To further improve the damping properties of the sound-guiding element, the sound-guiding element can also be provided or filled with an acoustically damping additional material, for example a damping material in the form of a mat, a fleece or another filling material. In addition, such an additional material can also be used to provide support for the sound-guiding element, for example, in relation to the outer door panel, wherein a transmission of oscillations from the sound-guiding element toward the outer door panel is suppressed or is at least damped owing to the damping properties of the additional material.

The sound-guiding element can in principle also be designed differently from a diffuser of the above-described type. For example, the sound-guiding element can form a guide channel for guiding sound waves away from the loudspeaker, wherein said guide channel can open into the wet chamber and/or into the dry chamber of the vehicle door in order to radiate sound waves into the wet chamber and/or the dry chamber. The sound-guiding element designed as a guide channel here deflects the sound waves which are radiated rearwards in the direction of the outer door panel from the loudspeaker and guides said sound waves away from the loudspeaker in a specific desired manner in order to introduce the sound waves into the wet chamber and/or the dry chamber of the vehicle door.

The guide channel has an opening into the wet chamber and/or the dry chamber of the vehicle door. Said opening can be locally restricted in order to provide a locally restricted introduction of sound into the wet chamber and/or the dry chamber. However, it is also conceivable for the guide channel to be open transversely with respect to the center axis of the loudspeaker such that sound waves can be radiated transversely with respect to the center axis of the loudspeaker from the region of the sound-guiding element.

Slats for guiding sound waves can be arranged in the region of the opening of the guide channel. An acoustically damping filler can be provided at said slats, which filler can be applied to the slats in the manner of a coating for the frequency-selective absorbing of sound waves, or which filler completely fills an intermediate space between every two slats such that sound waves emerging from the guide channel penetrate the filler.

In addition, a filler can be at least partially introduced into the guide channel such that the guide channel is at least partially filled with a filler. The filler can be designed in such a manner that it absorbs (damps) sound waves in a frequency-selective manner or allows the sound waves to pass. For example, high-frequency portions of the sound wave can be damped in a specifically desired manner while low-frequency portions can pass through the guide channel without substantial damping.

It is also possible at least partially to coat at least one wall of the guide channel with an absorbing material, wherein an absorbing layer applied in this manner can likewise be designed for the frequency-selective damping of sound waves in order, for example, to damp high-frequency portions of the sound waves and to allow low-frequency portions to pass in a substantially unchanged manner.

The guide channel can be open transversely with respect to the center axis of the loudspeaker for the radiation of sound waves such that sound waves can be radiated in the radial direction with respect to the center axis. In this case, the sound-guiding element is substantially arranged between the loudspeaker and the outer door panel in order to prevent a direct propagation of the sound of sound waves from the loudspeaker toward the outer door panel.

However, it is conceivable also to configure the guide channel in a meandering or spiral manner, wherein the guide channel can run, for example, in the plane of the inner door panel or of a door module arranged on the inner door panel and can be provided integrally or as a separate component on the inner door panel or on a carrier plate of the door module.

Such a guide channel can have, for example, a circular, an oval or a rectangular opening cross section—as viewed in a plane transversely with respect to a main direction of propagation of sound waves in the guide channel. The opening cross section here can be constant in the size and shape thereof along the main direction of propagation. However, it is also conceivable for the opening cross section to vary in size and/or shape along the main direction of propagation of the sound waves. For example, the opening cross section can widen along the guide channel, as viewed from the loudspeaker toward the opening of the guide channel, such that the opening cross section becomes larger outward. By means of specific adaptation of the opening cross section, it is possible, for example, in a desired manner for frequencies to be selectively damped, and resonances of the guide channel to be set and predetermined and thus for a desired transmission of sound by means of the guide channel to be achieved.

In such a guide channel, fillers can also be provided in the region of the opening (optionally at slats) or else partially within the guide channel in order to influence a propagation and radiation of sound waves in a frequency-selective manner.

By means of a guide channel arranged in the manner of a "transmission line" on the inner door panel or on a door module, the transmission of sound waves radiated rearwards from the loudspeaker can be influenced in a desired manner. For example, such a guide channel can have resonances in the low-frequency range such that low-frequency portions of sound waves can be specifically amplified by means of the guide channel in order thereby to obtain an acoustic boosting in the base region of the radiated sound waves. The guide channel can be integrally formed, for example, in a carrier plate of a door module, wherein it is also conceivable to arrange the guide channel as an additional component on a carrier plate. The guide channel can have, for example, an overall length of a quarter of the average wavelength of a frequency range to be boosted.

The sound-guiding element is preferably integrated into a carrier element of a door module in such a manner that it forms an integral unit with the carrier element. The carrier element can be formed, for example, by a unit carrier of a door module to which other functional components, for example a window opener, the loudspeaker, a door lock or the like, can also be fixed.

BRIEF DESCRIPTION OF THE DRAWINGS

The concept on which the invention is based will be explained in more detail below with reference to the exemplary embodiments which are illustrated in the figures.

FIG. 13A shows a schematic view of an exemplary embodiment modified in relation to the exemplary embodiment according to FIG. 11.

FIG. 13B shows a schematic view of an outer door panel with different crash pads, of which one is integrated with a diffuser.

FIG. 17A shows a schematic view of a further exemplary embodiment of a sound-guiding element which forms a guide channel;

FIG. 17B shows a view of the arrangement according to FIG. 17A, as viewed in the viewing direction B according to FIG. 17A.

DETAILED DESCRIPTION

Figure 1:
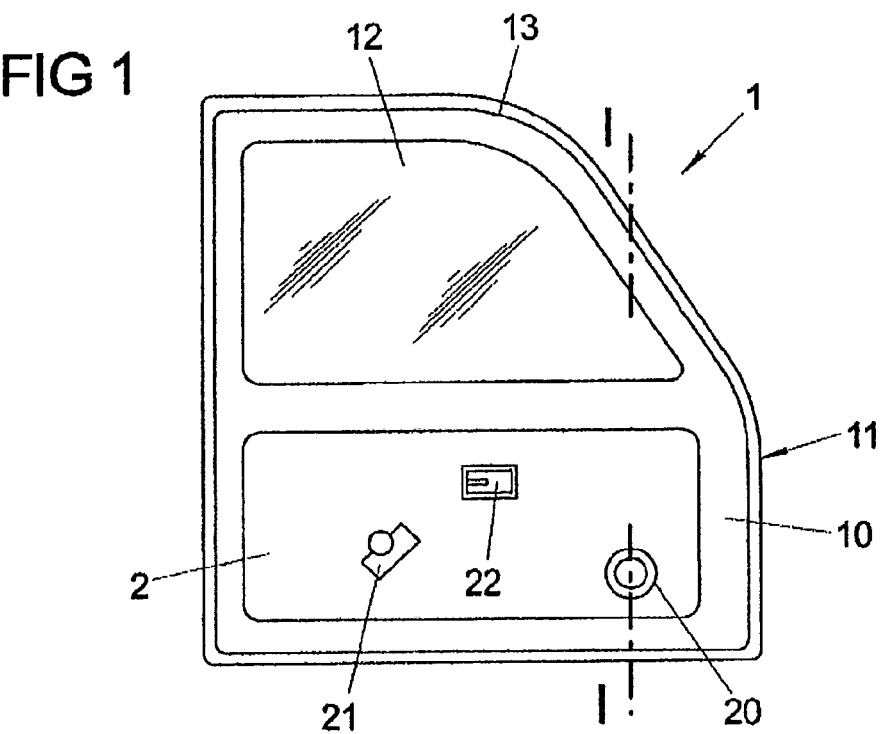
FIG. 1 shows a schematic view of a vehicle door.

FIG. 1 shows, in a schematic view, a vehicle door 1 which, in a manner known per se, has an inner door panel 10, an outer door panel 11 and a window opening which is bounded by a door frame 13 and is closed by a window 12. A door module 2 is arranged on the inner door panel 10, said door module, in a manner likewise known per se, having different functional components of the vehicle door 1 and being combined to form a modular, preassembled functional unit. Within this context, the door module 2 can comprise, for example, a loudspeaker 20, a drive unit 21 for a window opener and an inner door handle 22 and can close an opening in the inner door panel 10 in a moistureproof manner, as is known, for example, from DE 196 22 310 A1.

Figure 2:
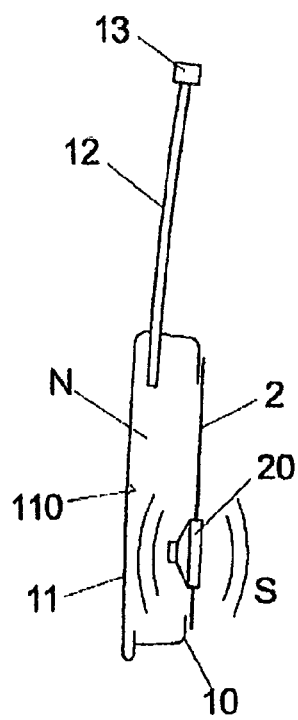
FIG. 2 shows a sectional view through the vehicle door along the line I-I according to FIG. 1.

An illustrated schematically in FIG. 2, the loudspeaker 20 radiates sound waves S in order to generate an acoustic tone which is perceptible in the interior of the vehicle. The loudspeaker 20 here is intended, as far as possible, to radiate the sound waves S preferably into the vehicle interior, i.e. forward away from the outer door panel 11.

However, it is not readily possible to prevent the loudspeaker 20 from also radiating sound waves S in the direction of the outer door panel 11 into the wet chamber N of the vehicle door 1, which wet chamber is formed between the inner door panel 10, the door module 2 and the outer door panel 11. If the sound waves S radiated rearwards from the loudspeaker 20 strike against the outer door panel 11, the sound waves S can be coupled into the outer door panel 11 and can excite the outer door panel 11 to generate structure-borne sound. In addition, stationary waves can be formed within the wet chamber N by sound waves reflected at the outer door panel 11.

Furthermore, oscillations of the loudspeaker 20 can also result in an excitation of the structure-borne sound of the door module 2 carrying the loudspeaker 20 or of the inner door panel 10 connected to the door module 2.

Overall, an excitation of components of the vehicle door 1 can bring about an excitation of structure-borne sound in conjunction with formation of stationary waves, for example, in the wet chamber N formed between the outer door panel 11 and the door module 2, which can lead to fading, blurring and booming of the loudspeaker tone and therefore to a disadvantageous effect on the system acoustics.

In order to counter this, within the context of the present invention, a sound-guiding element is arranged between the loudspeaker 20 of the door module 2 and the outer door panel 11, the sound-guiding element being configured to divert and deflect sound waves S radiated in the direction of the outer door panel 11 from the loudspeaker 20.

With reference to FIGS. 3 to 14A, 14B, specific exemplary embodiments of a sound-guiding element in the form of a diffuser 3 will be described below, wherein the exemplary embodiments are not intended to be limiting for the invention. Identical designations for components of identical function are used, if expedient, in the figures of the individual exemplary embodiments.

Figure 3:
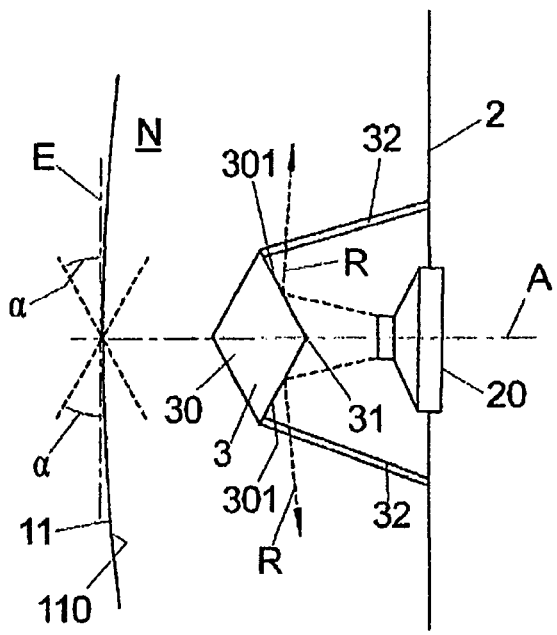
FIG. 3 shows a schematic view of a first embodiment of a sound-guiding element which is arranged between a loudspeaker of a door module and an outer door panel of the vehicle door and is in the form of a diffuser for reflecting sound waves which are radiated in the direction of the outer door panel from the loudspeaker.

In a first exemplary embodiment illustrated schematically in FIG. 3, a diffuser 3 is arranged between the loudspeaker 20 and the inner door panel 11 in the wet chamber N of the vehicle door 1. The diffuser 3 has a body 30 which can have, for example, the configuration of a rhombus (compare FIG. 4A) or of a cone (compare FIG. 4B). The diffuser 3 has one or more reflection surfaces 301 which are oriented in such a manner that they form an oblique angle α to a main plane of extent E along which the outer door panel 11 substantially extends. (It may be noted that the outer door panel 11 may be slightly curved. In this case, the main plane of extent E may be considered to be a tangential plane onto the outer door panel 11 at the intersection of a center axis A of the loudspeaker 20.)

The reflection surfaces 301 cause sound waves which are radiated rearwards from the loudspeaker 20 in the direction of an inner surface 110 of the outer door panel 11, which inner surface faces the loudspeaker 20, to be reflected in such a manner that the reflected sound waves R can strike against the inner surface 110 of the outer door panel 11 at most at a low angle, if at all. The reflection via the reflection surfaces 301 takes place in such a manner that the reflected sound waves R (illustrated with reference to the beam path thereof in FIG. 3) are deflected parallel to the main plane of extent E of the outer door panel 11 or at a low angle to said main plane of extent E within the wet chamber N of the vehicle door 1. An excitation of structure-borne sound of the outer door panel 11 because of sound waves striking perpendicularly or at an obtuse angle against the outer door panel 11 can thereby be effectively suppressed, and therefore an excitation of oscillations of the outer door panel 11 can be prevented or at least damped.

Figure 4A:
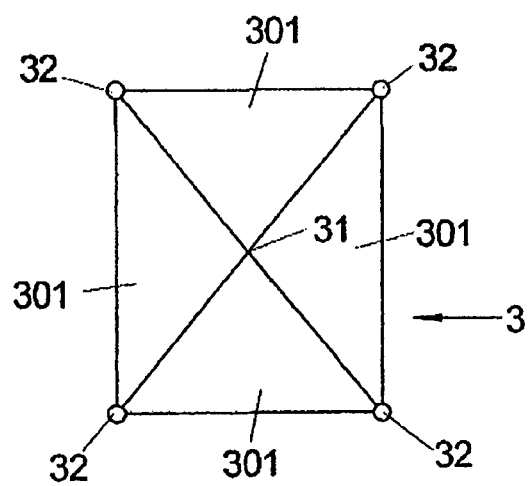
FIG. 4A shows a top view of a diffuser in the form of a rhombus.
Figure 4B:
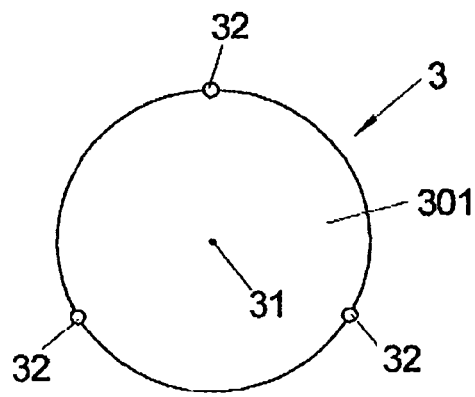
FIG. 4B shows a top view of a diffuser in the form of a cone.

The diffuser 3 is connected to the door module 2 via braces 32. As illustrated in FIGS. 4A and 4B, a plurality of braces 32 can be provided here, the braces being arranged on the diffuser 3 in such a manner that the braces 32 only insubstantially if at all, affect a propagation of sound of the reflected sound waves R and therefore do not provide a closed boundary surface for the reflected sound waves R. Sound waves radiated rearwards from the loudspeaker 20 are therefore reflected at the reflection surfaces 301 of the diffuser 3 and can be deflected past the braces 32 and through the braces 32 parallel to the plane E.

The diffuser 3 which is formed, for example, in the manner of a rhombus (FIG. 4A) or in the manner of a cone (FIG. 4B) has a tip 31 which faces the loudspeaker 20. Said tip 31 here can be concentric to a center axis A of the loudspeaker 20, which center axis corresponds to an axis of rotational symmetry of the loudspeaker 20 having a conical diaphragm and points through the center of gravity of the loudspeaker 20 substantially perpendicularly to the main plane of extent E of the outer door panel E.

Although a diffuser 3 in the form of a rhombus or a cone is illustrated by way of example in FIG. 4A and FIG. 4B, the diffuser 3 can in principle also have a different form. Sound waves are reflected here by means of one or more reflection surfaces 301 in such a manner that, firstly, they cannot strike perpendicularly against the outer door panel 11 and, secondly, cannot be directed directly back to the loudspeaker 20. Such a reflection directly back to the loudspeaker 20 could have the disadvantageous effect that reflected sound waves pass through the loudspeaker 20 and mix with other sound waves radiated from the loudspeaker 20, thus making it possible for the tone radiated by the loudspeaker 20 to become blurred or faded.

In the exemplary embodiment according to FIG. 3, the diffuser 3 is connected to the door module 2. The diffuser 3 can be manufactured, for example, integrally with the door module 2, for example with a unit carrier, which is manufactured from plastic, of the door module 2. This results in simple production with a cost-effective configuration of the diffuser 3.

Figure 5:
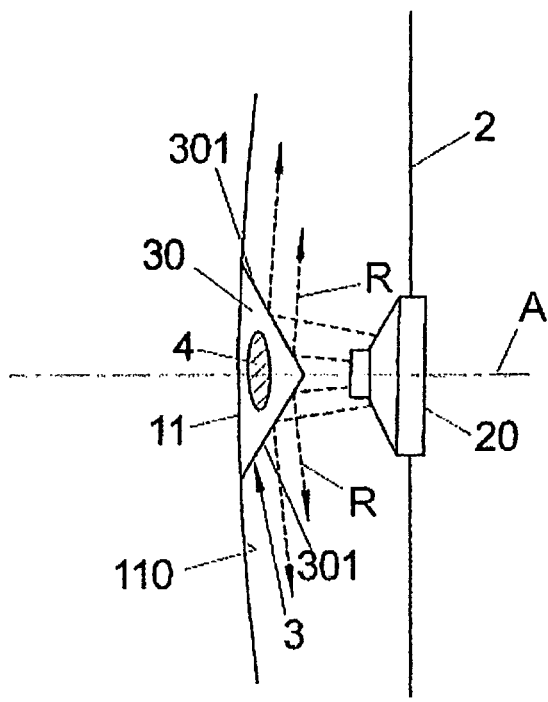
FIG. 5 shows a schematic view of a further embodiment of a diffuser between a loudspeaker and an outer door panel.

In another configuration, as illustrated in FIG. 5, the diffuser 3 can also be fastened to the outer door panel 11. The diffuser 3 can again comprise a tip 31 which points toward the loudspeaker 20 and one or more reflection surfaces 301 which are directed obliquely with respect to the main plane of extent E of the outer door panel 11 and bring about a suitable deflection of the sound waves radiated rearwards from the loudspeaker 20.

As illustrated in FIG. 5, the diffuser 3 can be connected to a crash pad 4 within the context of a functional integration or can be configured integrally with such a crash pad 4. The crash pad 4 serves to receive and divert crash forces acting on the vehicle door 1, in particular in the event of a side impact, and, for example, can provide a suitable crumple zone for absorbing crash energy. The crash pad 4 can be arranged, for example, in the manner of a cross brace in the wet chamber N of the vehicle door 1, but can also be completely enclosed in the body 30 of the diffuser 3 within the context of a locally acting crash pad or can be formed integrally with the body 30.

Basic configurations of such crash pads are known per se, and therefore do not need to be discussed in more detail at this juncture.

Figure 6:
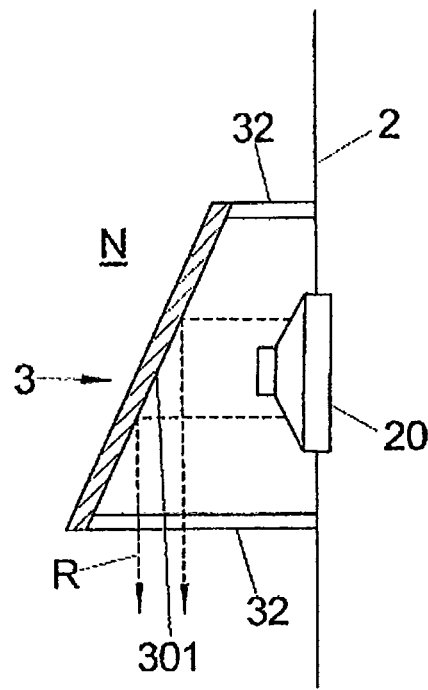
FIG. 6 shows a schematic view of a further exemplary embodiment of a diffuser.

FIG. 6 shows a further exemplary embodiment of a diffuser 3 which is formed by an obliquely positioned reflection surface 301 which is connected to the door module 2 via braces 32, for example is formed integrally with the door module 2. The reflection surface 301 reflects sound waves radiated rearwards from the loudspeaker 20, and therefore the reflected sound waves R can strike against the outer door panel 11 at least only at a low angle, if at all. The reflected sound waves R here are deflected by the reflection surface 301 through the braces 32, wherein the braces 32 affect the propagation path of the reflected sound waves R at least insubstantially, if at all.

Figure 7:
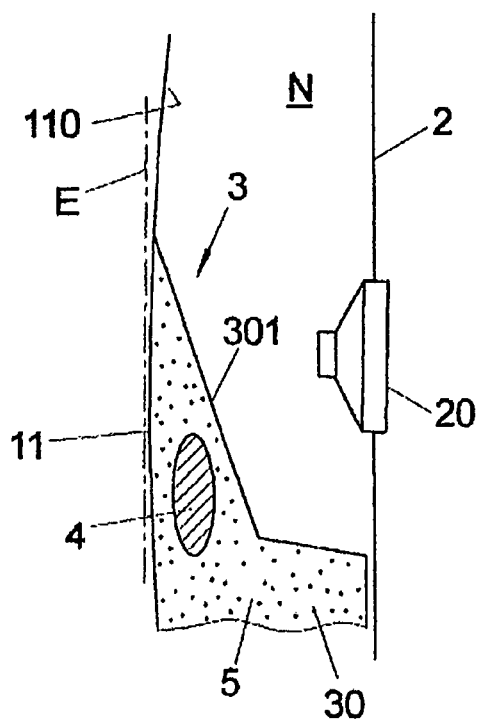
FIG. 7 shows a schematic view of a further exemplary embodiment of a diffuser.

In a further exemplary embodiment illustrated in FIG. 7, a diffuser 3 is arranged on the outer door panel 11. The diffuser 3 extends in the wet chamber N of the vehicle door as far as the door module 2 and can bear in a supporting manner against the door module 2 or the inner door panel 10. In addition, the diffuser 3 is connected to a crash pad 4 or is formed integrally therewith, and is additionally filled with an additional material 5, for example in the form of a damping material. Via a reflection surface 301 which, in turn, is directed obliquely with respect to a main plane of extent E of the outer door panel 11, sound waves radiated rearwards from the loudspeaker 20 are reflected and therefore said sound waves cannot strike perpendicularly against the outer door panel 11.

Figure 8:
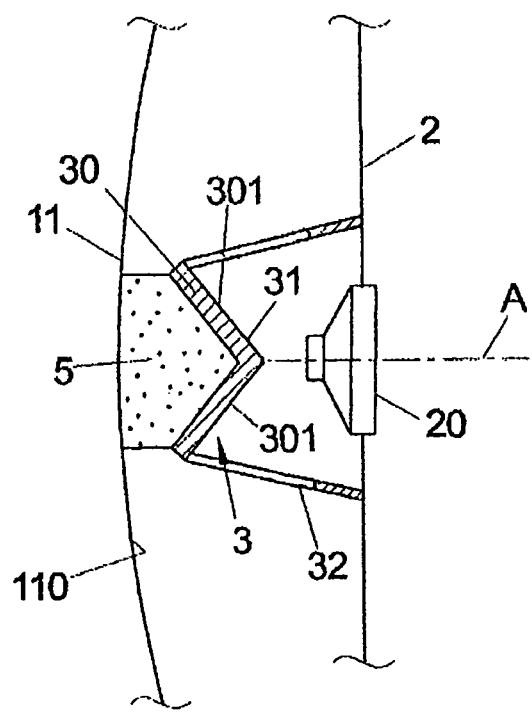
FIG. 8 shows a schematic view of a further exemplary embodiment of a diffuser.

In an exemplary embodiment of a diffuser that is illustrated in FIG. 8, said diffuser can be configured, for example, in the form of a cone or rhombus and can be connected to the door module 2 via braces 32. In addition, the diffuser 3 is supported in relation to the outer door panel 11 via an additional material 5, for example in the form of a damping material, such that a supporting connection between the outer door panel 11 and the door module 2 is provided via the diffuser 3. The additional material 5 here is composed in such a manner that a transmission of oscillations from the diffuser 3 to the outer door panel 11 is effectively damped, and therefore structure-borne sound cannot be transmitted from the diffuser 3 toward the outer door panel 11.

Figure 9:
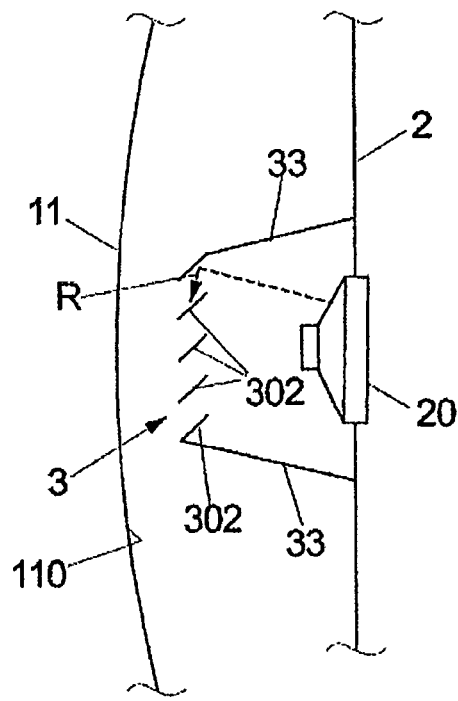
FIG. 9 shows a schematic view of a further exemplary embodiment of a diffuser comprising slats.

In an exemplary embodiment illustrated in FIG. 9, the diffuser 3 is configured with slats 302 which are designed in such a manner that they prevent radiation of sound waves perpendicularly against the outer door panel 11. The slats 302 here are connected to the door module 2 via a closed boundary surface 33 in the manner of a cup and, as illustrated in the enlarged view according to FIG. 10A, can have a reflecting inner surface 302a facing the loudspeaker 20 and an outer surface 302b covered with an absorbing layer 303.

If sound waves are radiated rearwards in the direction of the outer door panel 11 from the loudspeaker 20, said sound waves first of all strike against the inner surface 302a of the slats 302 and are reflected. The sound waves R reflected at a slat 302 strike here against the outer surface 302b of an adjacent slat 302 and are absorbed there, or are at least very substantially damped, by the absorbing layer 303 arranged on the outer surface 302b, and therefore sound waves are transmitted in the direction of the outer door panel 11 at least only in greatly damped form, if at all.

Figure 10A:
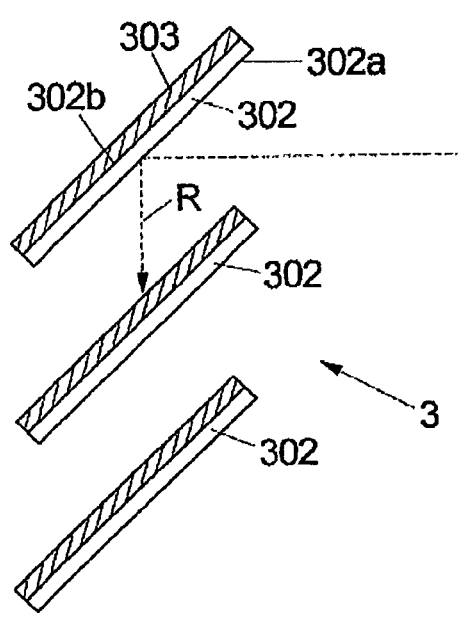
FIG. 10A shows an enlarged view of the slats of the diffuser of the exemplary embodiment according to FIG. 9.
Figure 10B:
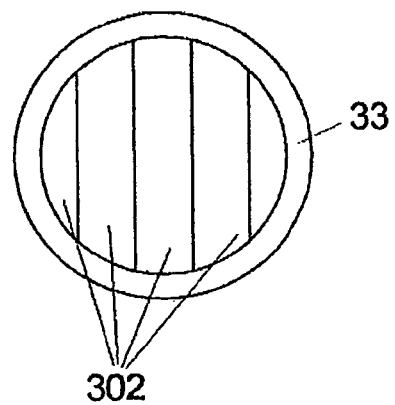
FIG. 10B shows a view of the slats, as seen from the loudspeaker.

As illustrated in FIG. 10B, the slats 302 are arranged in such a manner that they overlap, as seen in the direction of the outer door panel 11 from the loudspeaker 20, and therefore the sound waves radiated rearwards from the loudspeaker 20 are completely reflected at the slats 302. FIG. 10B here shows the slats 302, as seen from the loudspeaker 20. In this viewing direction, the slats 302 form a closed surface at which the radiated sound waves are reflected.

An absorbing layer of the above-mentioned type can in principle also be provided in a diffuser 3, as has been explained with reference to FIGS. 3 to 8. The absorbing layer and also a reflection surface 301 can be configured here in such a manner that absorption and/or reflection take/takes place in a frequency-dependent manner. For example, provision can be made for higher-frequency portions of sound waves to be absorbed at an absorbing layer whereas low-frequency portions are reflected. This makes it possible to specifically influence radiated sound waves within individual frequency ranges in order thereby to damp or to extinguish the radiated sound waves in a specific manner in individual frequency ranges.

Figure 11:
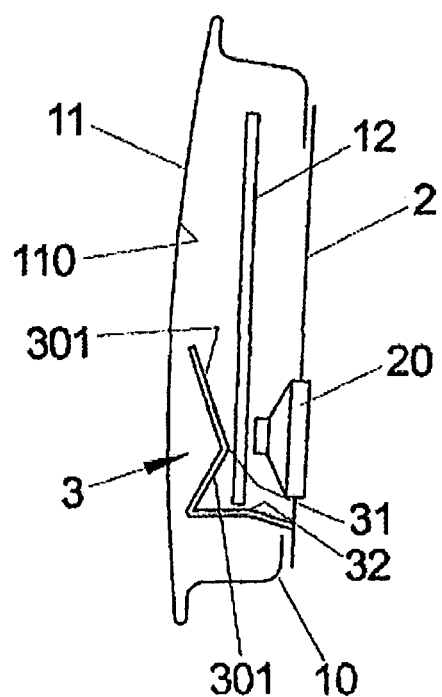
FIG. 11 shows a schematic sectional view along a section plane spanned by a transverse direction of the vehicle and a longitudinal direction of the vehicle, and representing the arrangement of a diffuser on a door module with adjustment of a window simultaneously being permitted.

FIG. 11 shows an exemplary arrangement of a diffuser 3 on a door module 2 via a brace 32. The connection here is such that a window 12 can move between the diffuser 3 and the loudspeaker 20, and therefore the diffuser 3 is arranged outside the adjustment path of the window 12. In order further to define the position of the diffuser 3 relative to the outer door panel 11, a support in relation to the outer door panel 11 in the manner illustrated in FIG. 8 can additionally be provided.

Figure 12:
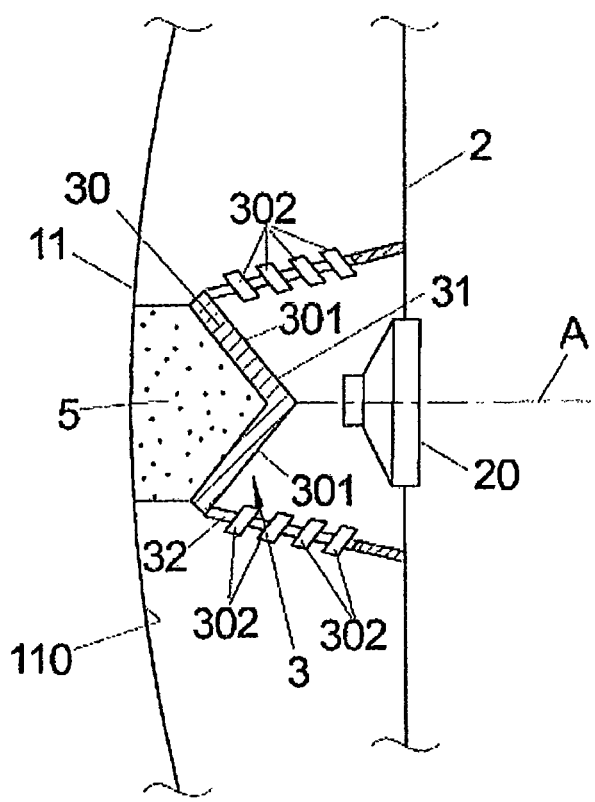
FIG. 12 shows a schematic view of an exemplary embodiment which is slightly modified in relation to the exemplary embodiment according to FIG. 8.

FIG. 12 shows a further exemplary embodiment of a sound-guiding element in the form of a diffuser 3 which is only slightly modified in relation to the exemplary embodiment according to FIG. 8. In the exemplary embodiment according to FIG. 12, the braces 32 are provided with slats 302 which guide and deflect sound waves S reflected from the diffuser 3 in order to obtain an advantageous radiation of said sound waves S from the region of the diffuser 3.

The alignment of the slats 302 in FIG. 12 should be understood merely by way of example. The slats 302 are directed in such a manner that an advantageous diverting of the sound waves S from the diffuser is achieved, but, as far as possible, radiation of sound waves S back into the region of the diffuser 3 is prevented.

In the exemplary embodiment according to FIG. 12, analogously as have been described with reference to FIGS. 9 and 10A, 10B, the slats 302 can be coated on one side or both sides with an absorbing material.

A further exemplary embodiment which is linked to the exemplary embodiment according to FIG. 11 is illustrated in FIGS. 13A and 13B. In an extension to the exemplary embodiment according to FIG. 11, in this exemplary embodiment a filling material 5 is provided on the diffuser 3, the filling material supporting the diffuser 3 in relation to the outer door panel 11. The filling material 5 here is composed in such a manner that a transmission of oscillations from the diffuser 3 to the outer door panel 11 is damped, and therefore structure-borne sound cannot be transmitted from the diffuser 3 toward the outer door panel 11.

As illustrated in FIG. 13B the filling material 5 for supporting the diffuser 3 in relation to the outer door panel 11 is integrated into a crash pad 4. The crash pad 4 illustrated on the left in FIG. 13B therefore serves, firstly, for absorbing crash forces which are introduced into the vehicle door 1 in particular in the case of a side crash. Secondly, however, the crash pad 4 also serves for supporting the diffuser 3 and therefore for the acoustic damping of sound waves which are radiated in the direction of the outer door panel 11 from the loudspeaker 20.

Further crash pads 4 can be provided, said crash pads being able to be configured integrally with the crash pad 4 illustrated on the left in FIG. 13B or also being able to be present separately from the crash pad 4 illustrated on the left in FIG. 13B.

Figure 14A:
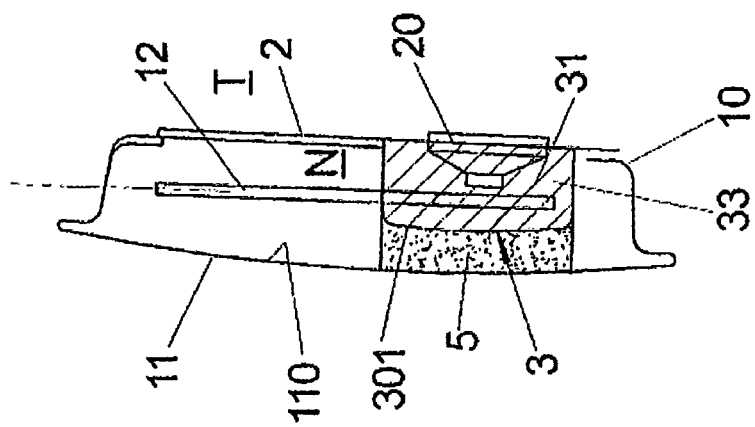
FIG. 14A shows a schematic view of a further exemplary embodiment which is modified in relation to the exemplary embodiment according to FIGS. 13A and 13B.
Figure 14B:
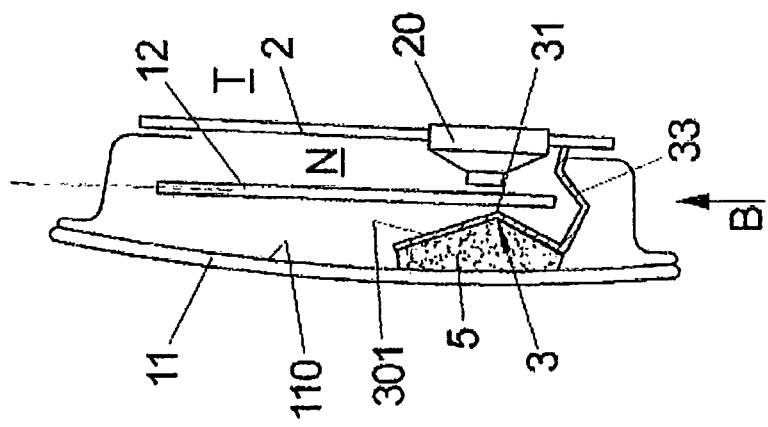
FIG. 14B shows a different view of the exemplary embodiment according to FIG. 14A.

FIGS. 14A and 14B show a further exemplary embodiment of a diffuser 3 which is supported in relation to the outer door panel 11 via filling material 5. FIG. 14A here shows a view from above into a vehicle door 1. FIG. 14B shows a side view, as viewed in the longitudinal direction of the vehicle (when the vehicle door 1 is correctly installed in a vehicle).

In the exemplary embodiment according to FIGS. 14A, 14B, the diffuser 3 is connected to the unit carrier of the door module 2 via a closed boundary surface 33, wherein said closed boundary surface 33 is arranged outside the displacement path of the window 12 and, when the window 12 is open (corresponding to the position in FIGS. 14A, 14B), engages around the window 12. The diffuser 3 is supported in relation to the outer door panel 11 via the filling material 5, wherein, as described above with reference to FIGS. 13A, 13B, the support can be integrated into a crash pad 4.

The exemplary embodiments described above are in each case provided with a sound-guiding element in the form of a diffuser 3 which serves to reflect sound waves S, which are radiated rearwards from the loudspeaker 20, in such a manner that the sound waves S cannot strike perpendicularly against the inner surface 110 of the outer door panel 11 in a directly radiated manner from the loudspeaker 20. This is intended at least to reduce an excitation of sound of the outer door panel 11, and it is intended to prevent sound waves reflected from the outer door panel 11 being able to pass in turn through the loudspeaker 20 and thereby being able to lead to fading, blurring or booming of the loudspeaker tone.

With reference to FIGS. 15 to 24, further exemplary embodiments will be described below, in which a sound-guiding element is configured as a guide channel in order to guide sound radiated rearwards from the loudspeaker 20 away from the loudspeaker 20 in a specific manner. This is intended to achieve a specific coupling of a wet chamber N of the vehicle door 1, said coupling bringing about a boosting of low-frequency portions of the sound and damping of high-frequency portions (as in the exemplary embodiments according to FIGS. 15 to 21), or a guide channel in the manner of a "transmission line" is intended to be provided, said guide channel guiding sound in a specific manner into a dry chamber T of the vehicle door 1 with advantageous phase/propagation displacement between sound radiated on the front side and on the rear side of the loudspeaker diaphragm and with excitation and boosting of low frequency portions of the sound (as in the exemplary embodiments according to FIGS. 22 to 24).

Figure 15:
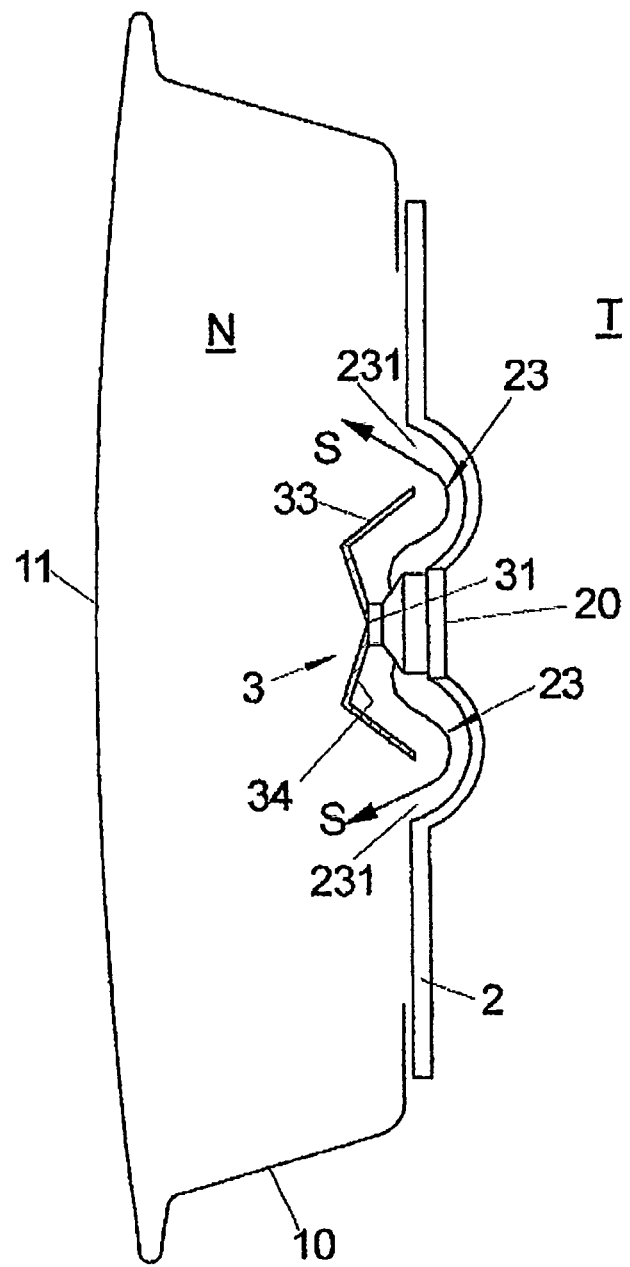
FIG. 15 shows a schematic view of a sound-guiding element in the form of a guide channel.

In the exemplary embodiment according to FIG. 15, a sound-guiding element 3 is provided on the rear side of a loudspeaker 20, said sound-guiding element, together with the unit carrier of a door module 2, creating a guide channel 23 via which sound waves S are introduced into a wet chamber N of the vehicle door 1, which wet chamber is formed between the inner door panel 10 and the outer door panel 11. The sound-guiding element 3 can be formed integrally with the unit carrier of the door module 2. However, the sound-guiding element 3 can also be produced as a separate component and can be fitted to the unit carrier by means of a clip connection or the like.

With walls 230, 34, the sound-guiding element 3 forms a guide channel 23 via which sound waves S are introduced from the loudspeaker 20 into the wet chamber N of the vehicle door 1. The air volume of the wet chamber N is coupled up in a specific manner by means of the guide channel 23, wherein the guide channel 23 can be composed in such a manner that coupling up takes place in particular in the low-frequency range, but high-frequency portions of the sound are damped.

Figure 16A:
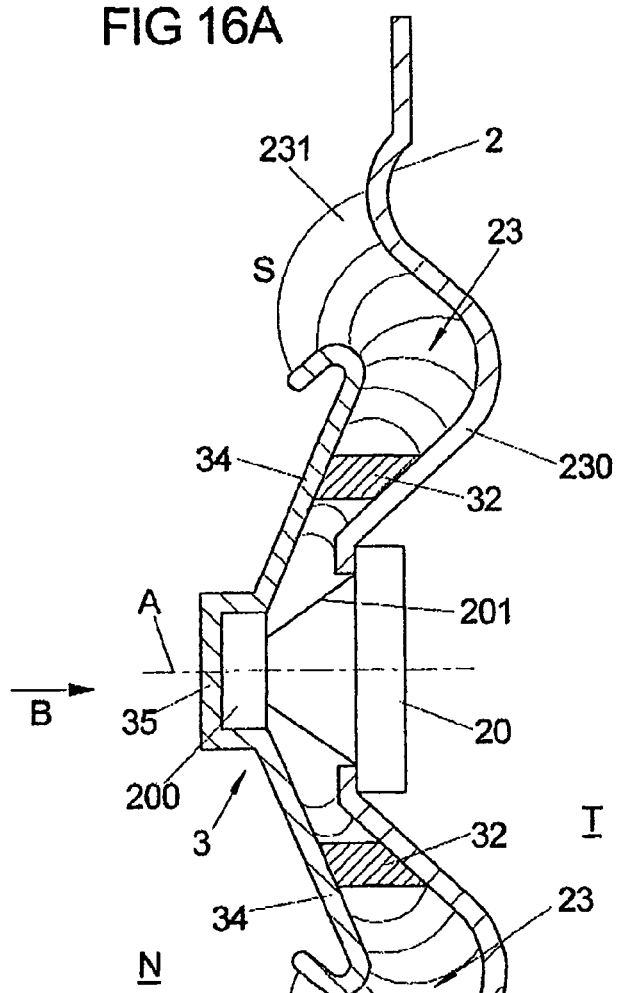
FIG. 16A shows a schematic view of a sound-guiding element in the form of a guide channel.
Figure 16B:
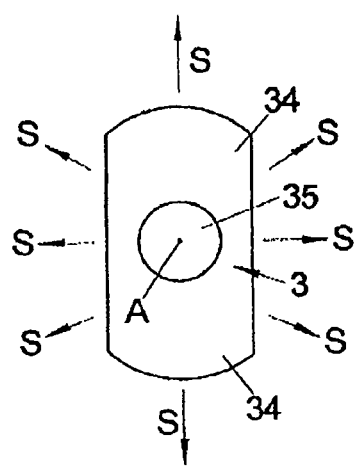
FIG. 16B shows a view of the arrangement according to FIG. 16A, as viewed in the viewing direction B according to FIG. 16A.

FIGS. 16A, 16B show a specific exemplary embodiment of such an arrangement. A sound-guiding element 3 is connected via a fastening point 35 to a magnet 200 of the loudspeaker 20, wherein the magnet 200 is connected to the unit carrier of the door module 2 via a loudspeaker frame 201. The sound-guiding element 3 has a wall 34 which, as is apparent from the view according to FIG. 16B, has an approximately rectangular design (FIG. 16B shows the sound-guiding element 3, as viewed in the viewing direction B according to FIG. 16A). The sound-guiding element 3 is connected to the unit carrier of the door module 2 via braces 32 and is held via the latter on the unit carrier, wherein the sound-guiding element 3 is produced integrally with the unit carrier, for example by mean of plastics injection molding, or else can be designed as a separate component and fitted retrospectively to the unit carrier.

The sound-guiding element 3, by means of the wall 34 thereof, together with a wall 230 of the unit carrier, forms a guide channel 23 which is open transversely with respect to the center axis A of the loudspeaker 20 and therefore, as illustrated in FIG. 16B, permits sound radiation in all spatial directions transversely with respect to the center axis A.

By means of the walls 230, 34, the sound waves S are guided between the sound-guiding element 3 and the unit carrier of the door module 2 and therefore are conducted into the wet chamber N of the vehicle door 1, wherein the shaping of the guide channel 23 can specifically excite low-frequency sound portions in the air volume of the wet chamber N, whereas high-frequency portions of the sound are damped.

In the exemplary embodiment according to FIGS. 16A, 16B, the sound-guiding element 3 has an approximately rectangular design (in a rearward view in the viewing direction B, see FIG. 16B). As illustrated in FIGS. 17A, 17B, the sound-guiding element can also, however, be formed in a substantially rotationally symmetrical manner about the center axis A of the loudspeaker 20 such that, in the rearward view in the viewing direction B, as illustrated in FIG. 17B, an approximately circular design of the sound-guiding element 3 is produced.

Figure 18:
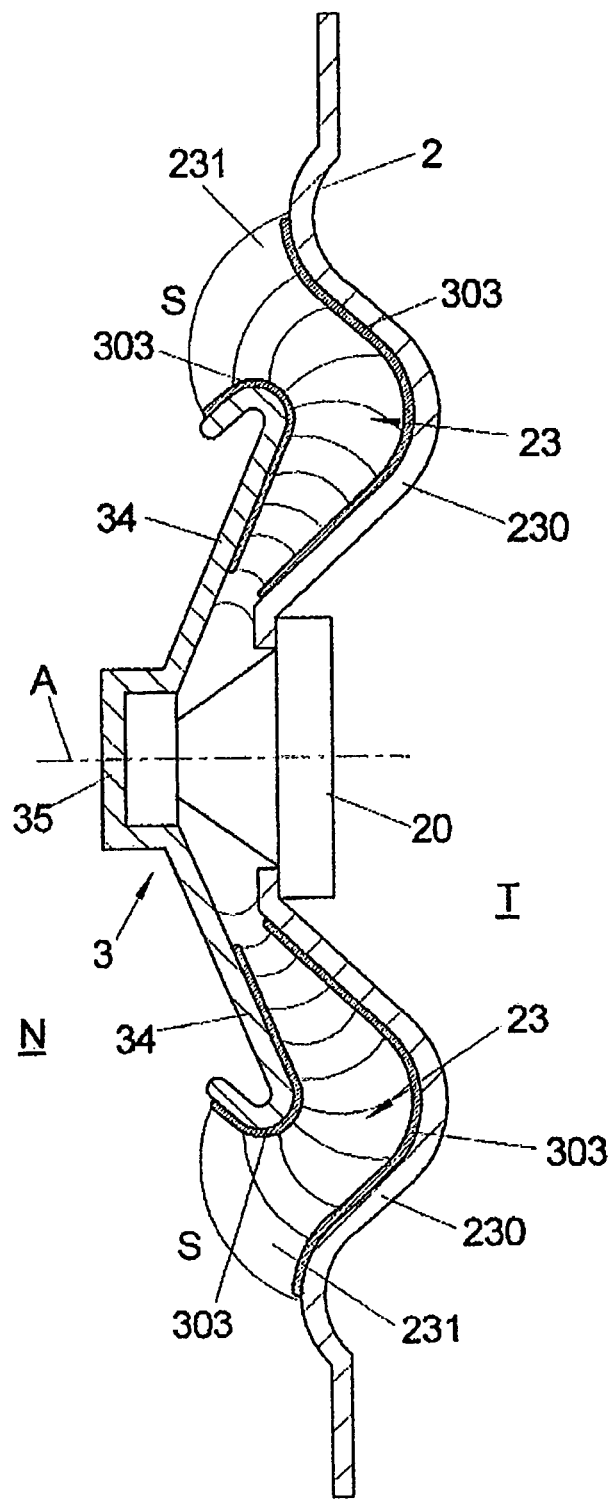
FIG. 18 shows a schematic view of an exemplary embodiment of a sound-guiding element forming a guide channel in which walls are partially coated with an absorbing layer.

As illustrated in FIG. 18, both in the exemplary embodiment according to FIGS. 16A, 16B and in the exemplary embodiment according to FIGS. 17A, 17B, the walls 230, 34 can be provided with an absorbing layer 303 which can be configured in such a manner that, for example, low-frequency portions can pass through the guide channel 23 in a substantially undamped manner, whereas high-frequency portions are acoustically damped, and therefore high-frequency portions are filtered out in a specific manner.

Figure 19:
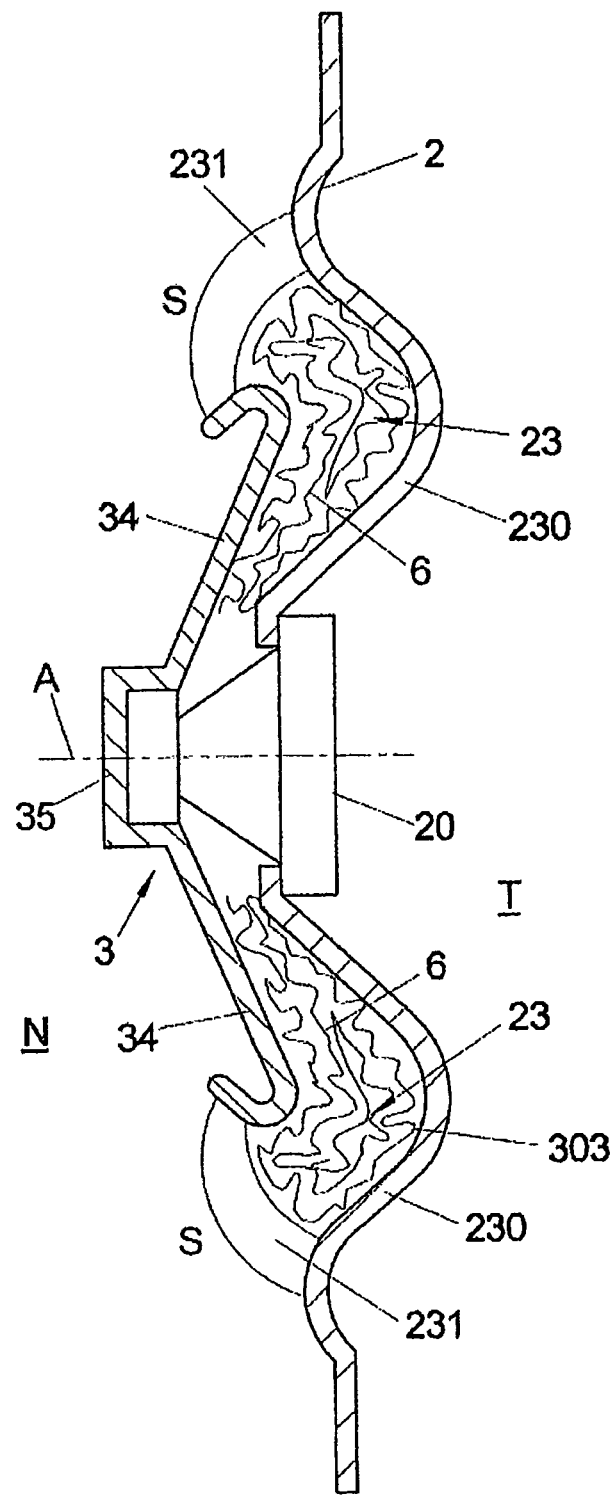
FIG. 19 shows a schematic view of an exemplary embodiment of a sound-guiding element forming a guide channel, in which the guide channel is at least partially filled with a filler.

It is also conceivable, as illustrated in FIG. 19, at least partially to fill the guide channel 23 with a filler 6 which can be configured to allow low-frequency portions to pass but to damp high-frequency portions of the sound.

By means of the use of an absorbing layer 303 or of a filler 6, the frequency-selective behavior of the guide channel 23 can be further modified and adapted in a desired manner.

Figure 20:
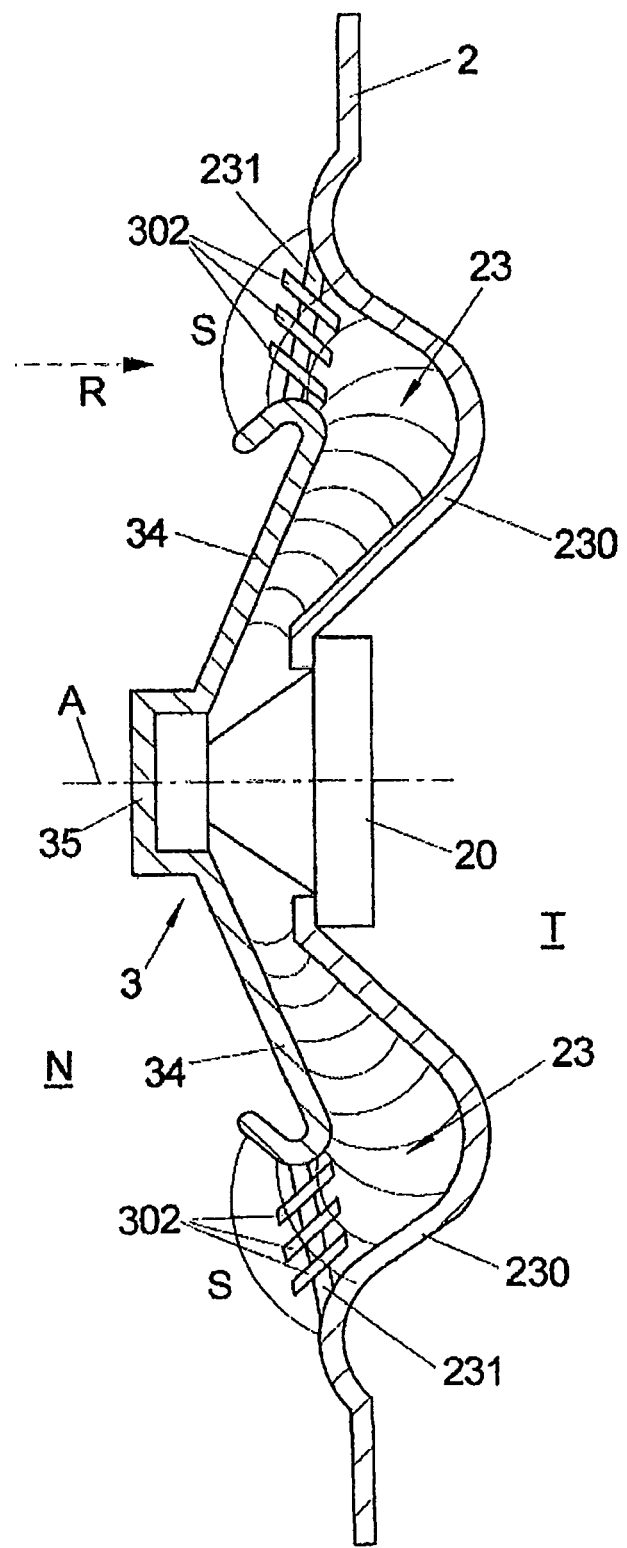
FIG. 20 shows a view of an exemplary embodiment of a sound-guiding element which forms a guide channel, in which slats are arranged in the region of an opening.

The guide channel 23 opens via an opening 302 towards the wet chamber N, wherein said opening 302 runs around the center axis A and therefore, as illustrated in FIGS. 16B and 17B, a radiation of sound radially with respect to the center axis A is made possible. As illustrated in FIG. 20, slats 302 can be arranged in the region of the opening 231, said slats being composed in such a manner that the sound waves S are directed out of the guide channel 23 in a desired manner.

Figure 21:
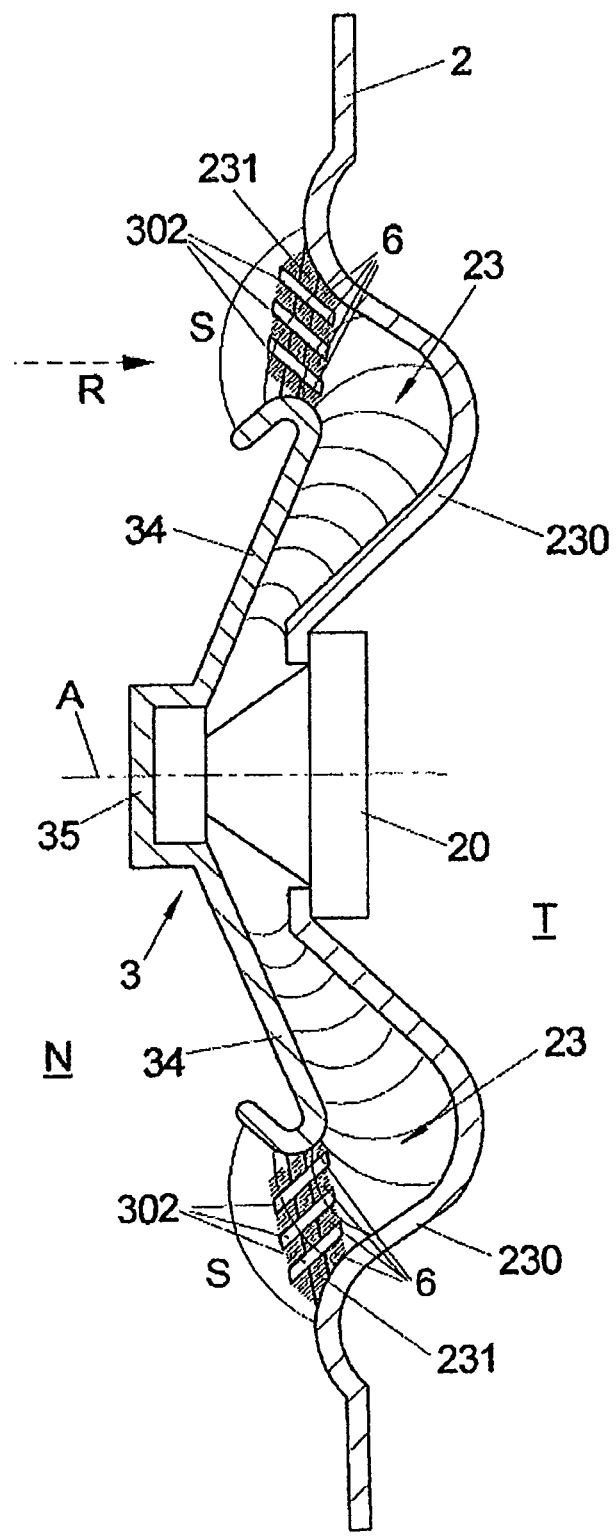
FIG. 21 shows a view of an exemplary embodiment of a sound-guiding element forming a guide channel, in which slats with a filler provided thereon are arranged in the region of an opening.

As illustrated in FIG. 21, in a further modification, packets of filler 6 can be arranged between the slats 302, said packets therefore very substantially closing the opening 231. The filler 6 is preferably composed in such a manner that high-frequency portions of the sound are damped, whereas low-frequency portions can pass in a substantially undamped manner.

The slats 302 also make it possible in particular to prevent sound waves R' beamed back from the outer door panel 11 from being able to be coupled in turn into the guide channel 23. Such beamed-back sound waves R' can be reflected by means of the slats 302 and thrown back into the wet chamber N, and therefore coupling of said beamed-back sound waves R' into the guide channel 23 is prevented.

Figure 22:
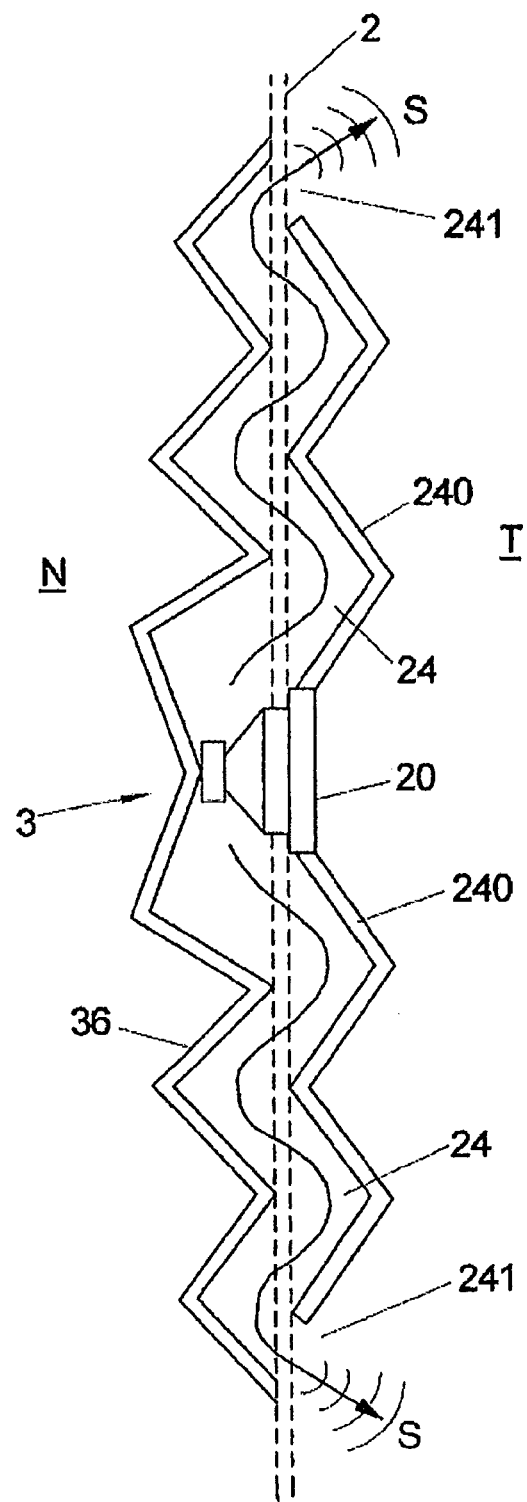
FIG. 22 shows a schematic view of a sound-guiding element forming a guide channel.
Figure 23A:
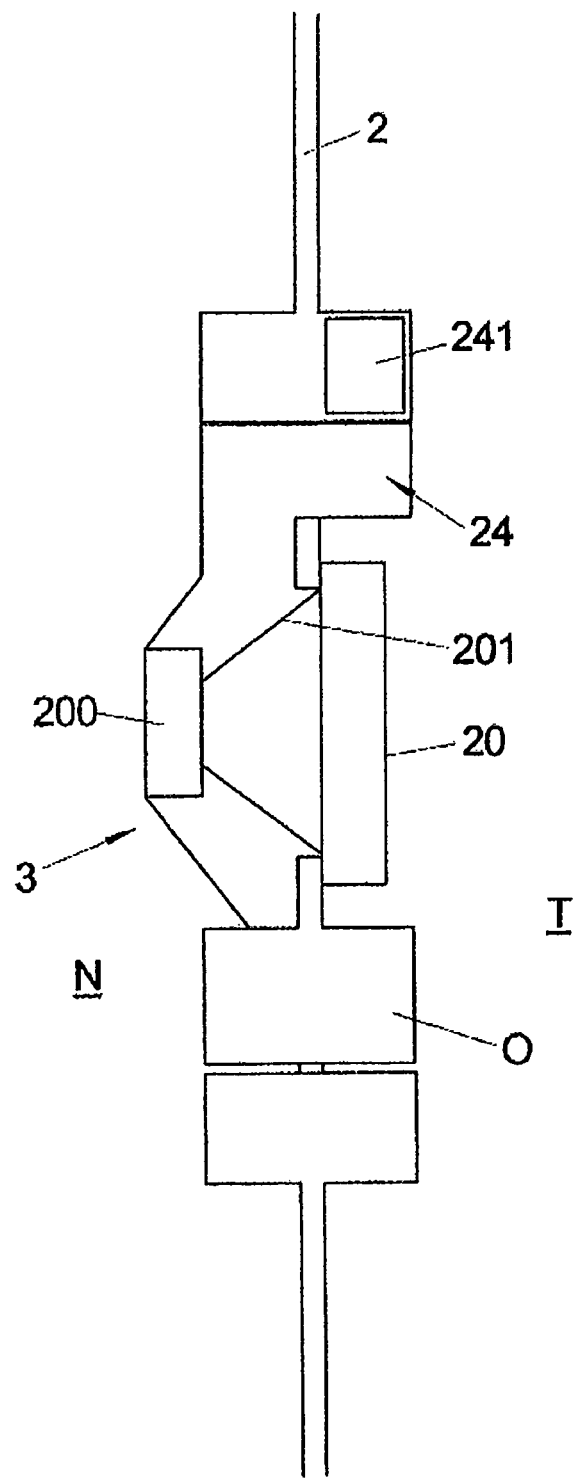
FIG. 23A shows a schematic view of a sound-guiding element forming a guide channel, as viewed on a cross-sectional plane perpendicular to a plane of extent of a door module.
Figure 23B:
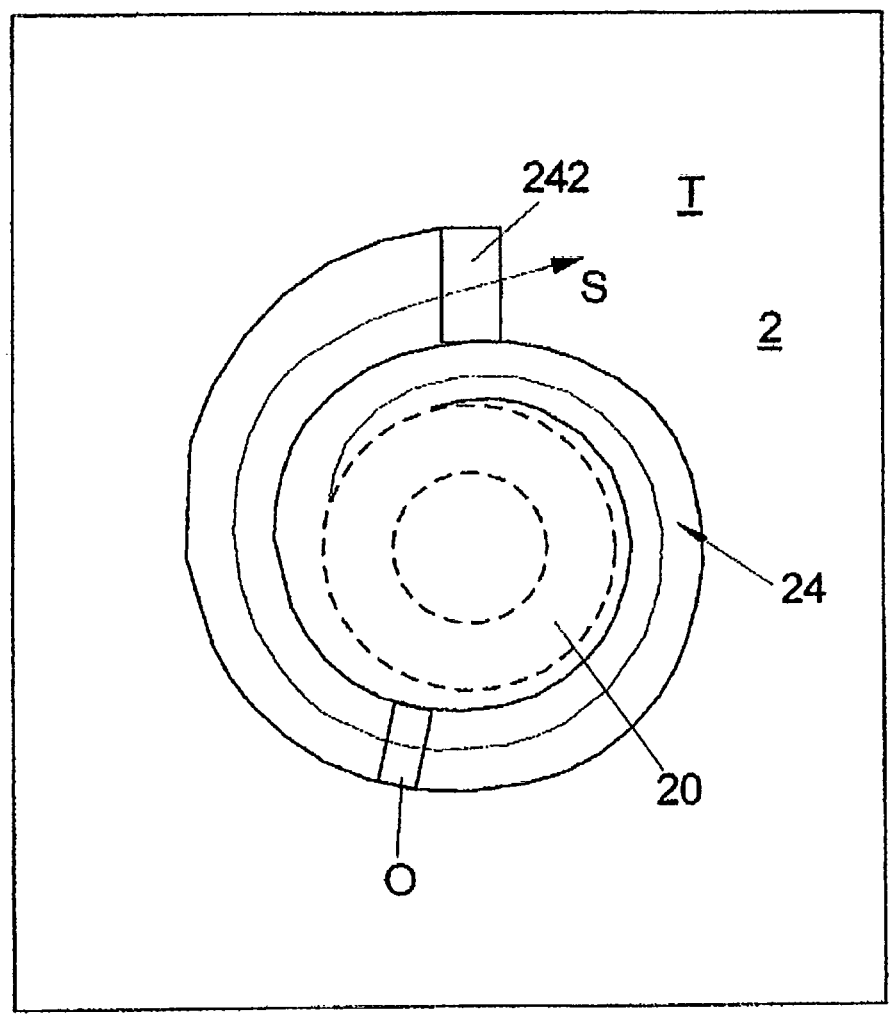
FIG. 23B shows a schematic view of the arrangement according to FIG. 23A, as viewed in the plane of extent of the door module.
Figure 24:
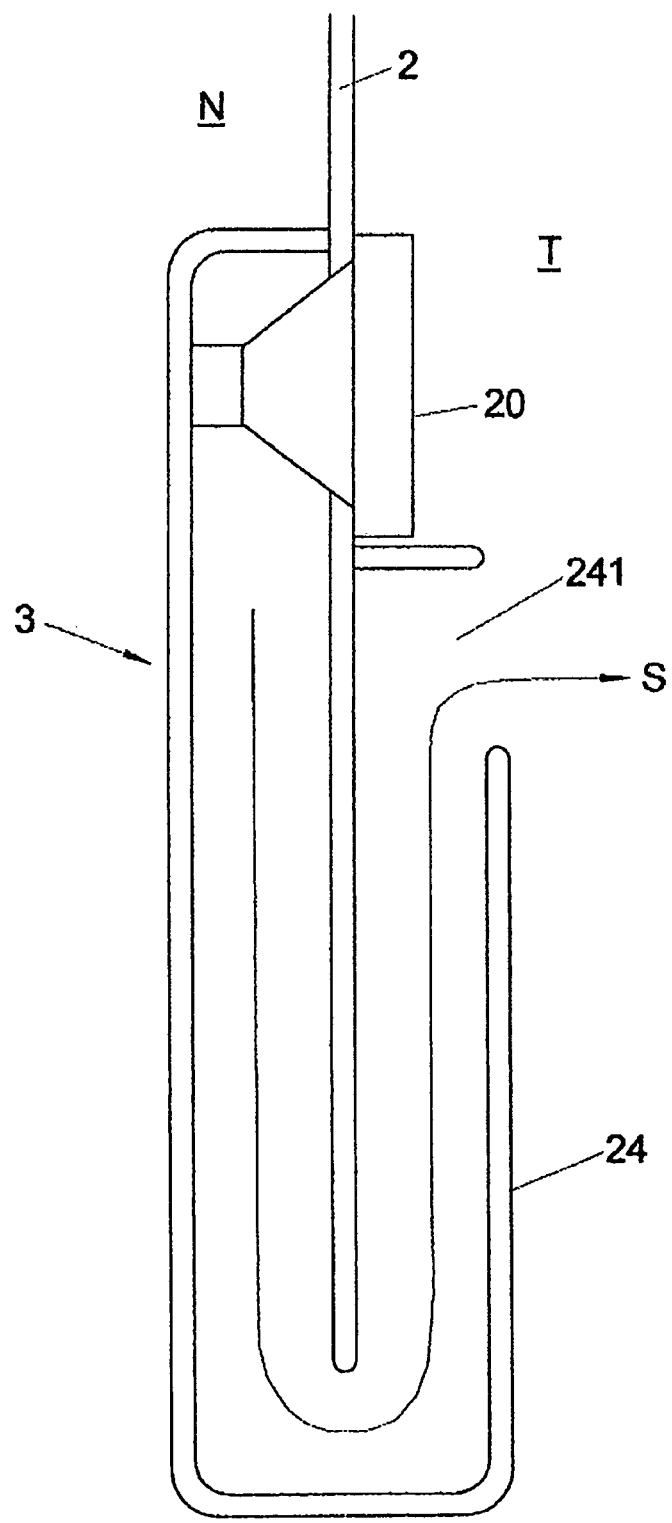
FIG. 24 shows a schematic view of another exemplary embodiment of a sound-guiding element forming a guide channel.

FIGS. 22 to 24 show exemplary embodiments of a sound-guiding element 3 which, together with the unit carrier of a door module 2, forms a guide channel 240 which extends in a spiral or meandering manner as a conduit or extends in an entirely different configuration on the door module 2 and thereby forms what is referred to as a "transmission line" which can have a resonance, in particular in the low-frequency range, and/or brings about a specific phase-propagation displacement between sound radiated on the front side and on the rear side of the loudspeaker diaphragm, and therefore serves to excite and transmit, in particular, the low-frequency portions of the sound.

The sound element 3 can be formed integrally with the unit carrier of the door module 2 in order to form the guide channel 24. It is also conceivable for the sound-guiding element 3 to be fitted as an additional component to the unit carrier 2, wherein provision can be made for the guide channel 24 to be formed only in the fitted state of the sound element 3 together with the unit carrier of the door module 2, or for the guide channel 24 to be completely formed on the sound-guiding element 3, to be present even before the sound-guiding element 3 is installed and to be fitted to the unit carrier 2 of the door module 2.

The sound waves S pass through the guide channel 24 formed by walls 240, 36 into the region of an opening 231 via which the sound waves S are radiated into the dry chamber T of the vehicle door 1, which dry chamber is located on a side of the door module 2 that faces away from the wet chamber N.

The sound path formed by the guide channel 24 can amount to, for example, a length of a quarter of the radiated wavelength, based on an average wavelength in a wavelength range to be boosted. The guide channel 24 therefore forms a tubular channel for radiated sound waves S, the length of which channel is adapted specifically in such a manner that the sound waves S within a predetermined wavelength range are transmitted in a specific manner with phase/propagation-displaced radiation of the sound portions radiated on the front side and on the rear side of the loudspeaker diaphragm and are therefore boosted, whereas the sound waves S are damped outside said wavelength range.

A plurality of guide channels 24 can be provided, said guide channels extending, for example, in a radiated manner from the loudspeaker 20 and opening toward the dry chamber T via one opening 241 each.

However, as illustrated in FIGS. 23A and 23B, it is also possible to provide an individual guide channel 24 which extends spirally on the door module 2. The guide channel 24 emerges from the loudspeaker 20, runs around the loudspeaker 20 and opens with an opening 241 toward the dry chamber T.

As emerges from FIG. 23A, the guide channel 24 has an opening cross section O which describes the clear width within the guide channel 24. As shown in the exemplary embodiment illustrated, the opening cross section O can be shaped rectangularly. However, it is also conceivable to shape the opening cross section O to be round or oval.

The opening cross section O can be constant in shape and size over the path of extent of the guide channel 24. However, it is also conceivable for the opening cross section O to change in shape and/or size along the guide channel 24. For example, the opening cross section O, as illustrated in FIG. 23B, can widen continuously in the direction of the sound propagation path such that the opening cross section O is smaller at that end of the guide channel 24 close to the loudspeaker 20 than in the region of the opening 241.

As illustrated in FIG. 24, the guide channel 24 can also extend in a meandering manner on the door module 2, wherein the length of the guide channel 24 is in turn matched in a specific manner to the wavelength range 24 to be transmitted.

In the exemplary embodiments according to FIGS. 22 to 24, a filler can also be arranged within the guide channel 24, the filler acting, for example, in a damping manner for high-frequency portions whereas the filler allows low-frequency portions to pass virtually unaffected.

It is also conceivable to coat the walls 240, 36 of the guide channel 24 with a suitable, frequency-selective material.

The concept on which the invention is based is not restricted to the exemplary embodiments described above, but can also be implemented in embodiments of entirely different types. In particular, the shaping of the diffuser is not restricted to the specific exemplary embodiments described above, but in principle can also be shaped in any other manner, as long as sound waves radiated in the direction of an outer door panel from a loudspeaker are reflected at the outer door panel in a suitable manner in order to damp the excitation of structure-borne sound.

The invention claimed is:

1. A vehicle door, comprising
an inner door panel,
an outer door panel with an inner surface facing the inner door panel
a door module comprising a carrier element configured to carry functional components of the vehicle door and being arranged on the inner door panel,
a loudspeaker on the carrier element of the door module, the loudspeaker being spaced apart from the outer door panel and being configured to generate acoustic sound waves, and
a sound-guiding element which is designed to deflect sound waves radiated in the direction of the outer door panel by the loudspeaker and to guide said sound waves into at least one of a wet chamber of the vehicle door, which wet chamber is formed between the inner door panel and the outer door panel, and into a dry chamber of the vehicle door, which dry chamber is formed on a side of the inner door panel that faces away from the outer door panel,
wherein the sound-guiding element is fastened via braces to the door module, and wherein slats for reflecting sound waves reflected at the sound-guiding element are arranged on the braces, the slats extending in parallel and being spaced from to each other.

2. The vehicle door as claimed in claim 1, wherein the sound-guiding element is formed by a diffuser which is arranged between the loudspeaker and the outer door panel and is designed to reflect sound waves radiated in the direction of the outer door panel by the loudspeaker in such a manner that they do not strike in a directly radiated manner perpendicularly against the inner surface of the outer door panel.

3. The vehicle door as claimed in claim 2, wherein the sound-guiding element has a reflection surface which is directed at an oblique angle to a main plane of extent along which the outer door panel extends.

4. The vehicle door as claimed in claim 2, wherein the sound-guiding element has a body in the form of a rhombus or a cone.

5. The vehicle door as claimed in claim 4, wherein the body has a tip facing the loudspeaker.

6. The vehicle door as claimed in claim 5, wherein the tip is arranged concentrically with respect to a center axis of the loudspeaker, the center axis pointing through the center of gravity of the loudspeaker and running along a main direction of radiation of the loudspeaker.

7. A vehicle door, comprising
an inner door panel,
an outer door panel with an inner surface facing the inner door panel,
a door module comprising a carrier element configured to carry functional components of the vehicle door and being arranged on the inner door panel,
a loudspeaker on the carrier element of the door module, the loudspeaker being spaced apart from the outer door panel and being configured to generate acoustic sound waves, and
a sound-guiding element which is designed to deflect sound waves radiated in the direction of the outer door panel by the loudspeaker and to guide said sound waves into at least one of a wet chamber of the vehicle door, which wet chamber is formed between the inner door panel and the outer door panel, and into a dry chamber of the vehicle door, which dry chamber is formed on a side of the inner door panel that faces away from the outer door panel,
wherein the sound-guiding element has a number of slats which are directed at an oblique angle to a main plane of extent along which the outer door panel extends, the slats extending in parallel and being spaced from each other.

8. The vehicle door as claimed in claim 7, wherein the slats are formed in a reflecting manner on an inner surface, which faces the loudspeaker, in order to reflect sound waves radiated in the direction of the outer door panel from the loudspeaker and, on an outer surface facing away from the loudspeaker, bear an absorbing layer for absorbing sound waves.

9. The vehicle door as claimed in claim 7, wherein the slats are arranged with respect to one another in such a manner that sound waves reflected at the inner surface of a slat strike against the outer surface of an adjacent slat.

10. The vehicle door as claimed in claim 8, wherein the absorbing layer is configured for absorbing sound waves within a predetermined frequency range.

11. The vehicle door as claimed in claim 7, wherein
the sound-guiding element is fastened to at least one of the door module,
the outer door panel and the inner door panel.

12. The vehicle door as claimed in claim 7, wherein the sound-guiding element has a crash pad designed to absorb crash forces, or is connected to a crash pad.

13. The vehicle door as claimed in claim 2, wherein the sound-guiding element is filled with an acoustically damping additional material or is connected to such an additional material.

14. A vehicle door, comprising
an inner door panel,
an outer door panel with an inner surface facing the inner door panel,
a door module comprising a carrier element configured to carry functional components of the vehicle door and being arranged on the inner door panel,
a loudspeaker on the carrier element of the door module, the loudspeaker being spaced apart from the outer door panel and being configured to generate acoustic sound waves, and
a sound-guiding element which is designed to deflect sound waves radiated in the direction of the outer door panel by the loudspeaker and to guide said sound waves into at least one of a wet chamber of the vehicle door, which wet chamber is formed between the inner door panel and the outer door panel, and into a dry chamber of the vehicle door, which dry chamber is formed on a side of the inner door panel that faces away from the outer door panel,
wherein the sound-guiding element forms a guide channel on the door module for guiding sound waves away from the loudspeaker, the guide channel extending from the loudspeaker along the door module towards an opening formed on the door module to pass sound waves to at least one of the wet chamber and the dry chamber.

15. The vehicle door as claimed in claim 14, wherein slats for guiding sound waves are arranged in the region of the opening.

16. The vehicle door as claimed in claim 15, wherein an acoustically damping filler is arranged on the slats.

17. The vehicle door as claimed in claim 14, wherein the guide channel is at least partially filled with a filler for the frequency-selective damping of sound waves.

* * * * *